Dec. 20, 1955 L. F. HEILIG 2,727,706
DRAG REDUCTION IN AIRCRAFT
Filed April 6, 1953

INVENTOR:
Louis F. Heilig
By Hubert E. Metcalf
His Patent Attorney

United States Patent Office 2,727,706
Patented Dec. 20, 1955

2,727,706

DRAG REDUCTION IN AIRCRAFT

Louis F. Heilig, Manhattan Beach, Calif., assignor to Northrop Aircraft, Inc., Hawthorne, Calif., a corporation of California Application April 6, 1953, Serial No. 346,857

16 Claims. (Cl. 244—130)

My invention relates to aircraft and more particularly to a means and method of reducing drag in aircraft capable of such high speeds that aerodynamic heating occurs on surfaces exposed to the airflow thereover.

Many military fighters at the present time have maximum speeds approaching or surpassing acoustic velocity. Guided missiles such as rockets of the German V–2 type are flown at supersonic speeds up to several thousand miles per hour, for example.

The speed of sound varies with altitude, decreasing from 760 miles per hour at sea level to about 675 miles per hour at 30,000 feet. Ram temperature rises for these speeds are on the order of 70° to 90° F. In order to determine the maximum temperature to which the localized high friction areas on the surface of a plane flying at a given speed might be exposed, the ram temperature rise for that speed must be added to the atmospheric temperature in which the plane is flying.

On a standard United States Air Force summer day the atmospheric temperature at sea level is taken as 100° F. This temperature decreases with altitude up to 46,500 feet; after which it is assumed to remain constant. The kinetic temperature increase for a speed of 760 miles per hour is about 88° F. The maximum surface temperature to be expected on a plane flying under these conditions is, therefore, about 188, according to altitude.

At 1300 miles per hour the ram temperature rise goes up to about 260° F. At 2600 miles per hour, this increase goes to slightly more than 1000° F. In any event, there is a sharp rise in surface temperature as speed increases past Mach number 1.0. This temperature rise is herein referred to as "aerodynamic heating." Temperature rises encountered in the transonic range (500 to 800 M. P. H.) have not proved excessive for the light-metal alloys used in present aircraft, and permanent aerodynamic surface contours have been adequately maintained at even higher speeds by the use of stainless steel and similar materials.

It is also well known that the surface contour of aerodynamic members in aircraft, such as leading edges for example, should be different for maximum efficiency and lowest drag, at low and at high speeds. The familiar rounded leading edge is best for take-off and low speeds, while at higher speeds such as those in the transonic and supersonic ranges a sharp leading edge is highly desirable. In fact, it has already been proposed that leading edges of airfoils be made rotatable to present a rounded edge to the airstream at low speed and a sharp edge at higher speeds. Such expedients however involve complex problems of linkage, actuation, and control.

Guided missiles, particularly of the military type, take off, fly to a target destination and then are presumably destroyed. No safe landing problems exist. Consequently, a relatively simple means and method can be employed to change a leading edge contour from one most suitable for take-off and first acceleration through the subsonic speed range, to a contour most suitable for subsequent transonic and supersonic speeds. It is an object of my present invention to provide such a simple means and method.

It is a still further object of the present invention to provide a means and method of changing the surface contour of an element exposed to the airstream on an airplane completely automatically without the use of linkages or command control.

It is still another object of the present invention to provide an airplane construction automatically changing a surface contour from one most suitable for low speeds to one most suitable at high speeds when such high speed is reached.

It is again an object of the invention to provide an airplane construction that is highly efficient at both high and low speeds due to automatic change in a surface contour of said airplane.

Briefly my invention includes, in an airplane such as a guided missile, a member which has a permanent surface contour exposable to the airstream in flight. This permanent contour is modified before flight by an overlay which maintains a predetermined temporary contour at all temperatures up to a predetermined temperature attained in flight due to aerodynamic heating, at which flight temperature the overlay becomes detached from the permanently contoured surface because of the melting or softening of all or part of the overlay material. In this manner, for example, a temporary rounded leading edge can be made available for flight at a subsonic Mach number. The drag penalty which such a rounded edge imposes on the aircraft at Mach numbers over 1.0 can then be greatly reduced by the exposure of a permanent supersonic leading edge contour when supersonic speed is reached.

Materials such as low melting point metal alloys, hard waxes, and the like are preferably used to maintain the temporary predetermined contour, with melting points regulated as desired preferably within the range of about 100° to 200° F. for example, so that the temporary material will be disintegrated and sloughed away from the permanent contour as supersonic speeds are reached.

Other advantages and objects of the present invention will be more apparent from a perusal of the following description of the accompanying drawing in which.

Figure 1:
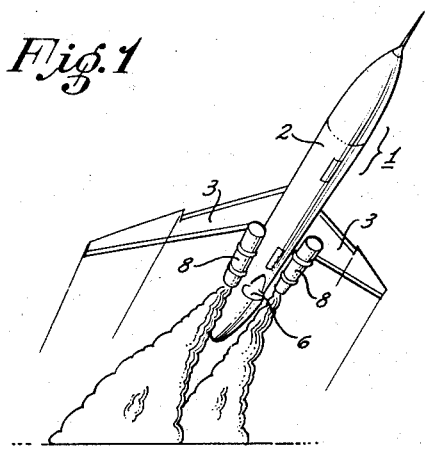
Figure 1 is a perspective view of a guided missile at take-off.
Figure 2:
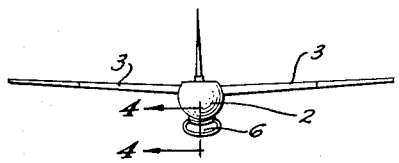
Figure 2 is a front view of that missile.
Figure 3:
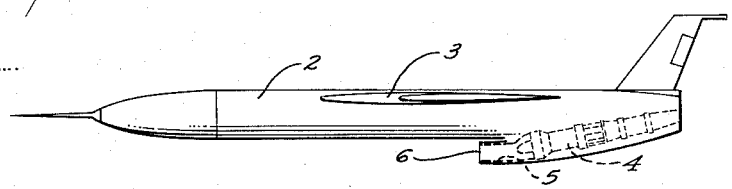
Figure 3 is a side view of that missile.

The invention will first be described as applied to surfaces creating pure drag, such as for example, the leading edge or lip of an air intake duct of a guided missile as shown in Figures 1, 2 and 3.

Here, a guided missile 1 is provided with a fuselage 2, wings 3 and a jet engine 4 at the rear of the fuselage, this engine 4 taking air through an air intake duct 5 having a forwardly opening air intake 6 surrounded by a lip 7.

Such missiles, as shown in Figure 1, are usually accelerated on take-off by detachable rockets 8 to relatively high top speeds in the near sonic, transonic and supersonic ranges.

To reduce drag at take-off and acceleration to high speeds, the lip 7 of the air intake should have a rounded contour. A sharp lip however, has a greatly reduced drag at supersonic speed. A highly desirable change of lip contour is provided, in accordance with the present invention, in a very simple manner as first exemplified by the arrangement shown in Figures 4 and 5.

Figure 4:
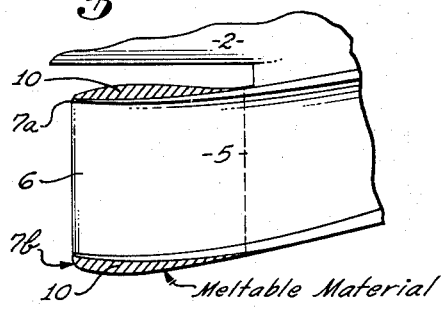
Figure 4 is a longitudinal sectional view of the engine air intake portion of that missile with a temporary subsonic lip contour.
Figure 5:
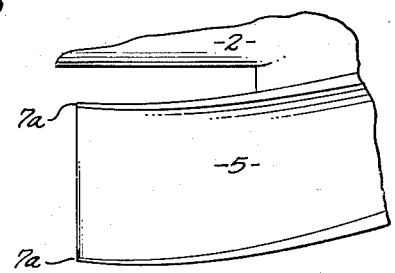
Figure 5 is the same sectional view showing the permanent supersonic lip contour after overlay removal.

In Figures 4 and 5 the lip 7 of the air intake opening is provided with a permanent sharp leading edge contour 7a as shown in Figure 5. This permanent contour is changed by the application thereto of an overlay 10, in this case entirely of meltable material applied over the permanent contour. This overlay is cast, sprayed or otherwise applied to the harder material, usually an aluminum alloy, used to form the permanent contour and is bonded, as by its own adherence, to the harder material. The overlay is then shaped to give a desired rounded leading edge 7b as desired, as shown in Figure 4, to reduce drag at take-off and the subsequent low speeds as acceleration to the high final flight speed takes place. As aerodynamic heating occurs at the higher speeds, the meltable material melts, and is carried away by the airstream until the permanent sharp contour 7a is exposed. Thus the drag of the lip of the engine air intake is greatly reduced as the aircraft enters its high speed flight range.

It has been found that a material melting at about 160° F. is satisfactory for general use in practicing the invention claimed herein, as such a material will hold its shape under most temperate climate conditions before flight and at subsonic speeds. In the polar regions lower melting point materials can be used, whereas in the tropics a higher temperature for melting of the overlay may be desirable. In general a satisfactory melting point range for the meltable material is between 100° and 200° F. to provide proper solidity on the ground with the assurance that the overlay will disintegrate in flight as speeds are reached where sharp lip contours are desirable.

As there are many materials suitable for the overlays that can be used in the practice of the present invention, I do not desire to be limited to any particular material. For example, there are a number of metal alloys that can be used, as follows:

TABLE 1

*Composition and melting temperatures of some low-melting eutectic metal alloys*

| Melting Points, ° F. | Composition, Percent | | | | |
|---|---|---|---|---|---|
| | Bismuth | Lead | Tin | Cadmium | Others |
| 158 | 50.00 | 26.70 | 13.30 | 10.00 | |
| 197 | 51.60 | 40.20 | | 8.20 | |
| 203 | 52.50 | 32.00 | 15.50 | | |
| 217 | 54.00 | | 26.00 | 20.00 | |
| 256 | 55.50 | 44.50 | | | |
| 266 | 56.00 | | 40.00 | | 4.00 Zn |
| 281 | 58.00 | | 42.00 | | |
| 288 | | 30.60 | 51.20 | 18.20 | |
| 291 | 60.00 | | | 40.00 | |

Each of the alloys in this table, being eutectic in nature, melts sharply at one temperature.

While such metal alloys are relatively heavy they can be used where the total volume of the overlay is such as to not unduly increase the weight of the aircraft. Where weight is a factor, there are various waxes or combinations of waxes that are suitable for overlay use, as follows:

TABLE 2

*Melting temperatures of some waxes and rosins*

Melting points, ° F. (approximately):
- 141.8 — Sumatra wax.
- 143 — Pure yellow beeswax.
- 156 — Bleached beeswax.
- 158 — Stearine or stearic acid.
- 161 — Palm wax (pure).
- 100–176 — Paraffins.
- 178 — Chinese insect wax.
- 185 — Carnauba wax.
- 212–282 — Pine rosin.
- 215–221 — Palm wax (natural).

Other suitable materials will be apparent to those skilled in the art.

Figure 7:
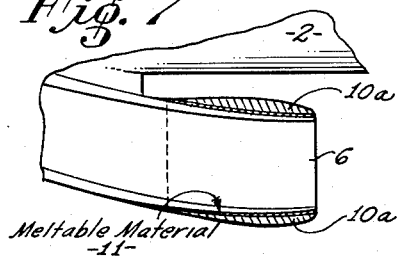
Figure 7 is a longitudinal sectional view taken as indicated by the line 7—7 in Figure 6.
Figure 6:
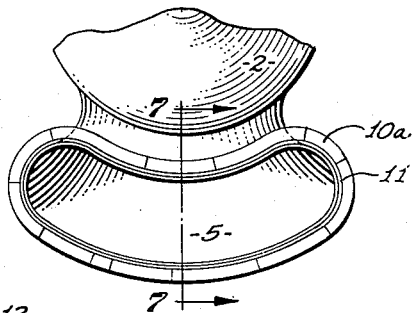
Figure 6 is a front view in elevation of a subsonic lip using fairings bonded to the permanent lip.

It is not, however, necessary to form the entire overlay of meltable material. For example, I have shown, in Figures 6 and 7, overlays 10a formed from a light metal for example, such as aluminum or magnesium, bonded to the permanent material of the lip 7 by a layer 11 of meltable material. This layer can be of metal alloy bonded, pinned, riveted or otherwise fastened to the light metal overlay and likewise attached to the permanent lip material. The light-metal overlay 10a is in this case preferably made in sections as best shown in Figure 6, so that as the bonding layer melts, the sections become detached to be swept away individually from the airplane by the airstream.

Figure 8:
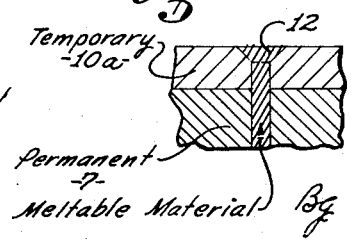
Figure 8 is a diagrammatic cross-sectional view of a riveted overlay.

Furthermore, as shown in Figure 8, the attachment between the temporary overlay 10a and the permanent lip material 7 can be also made by rivets 12, these rivets being made of the meltable material, which by melting in flight, will release the overlay to expose the sharp lip surface contour.

Figure 9:
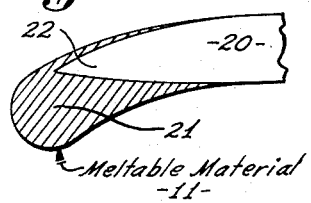
Figure 9 is a diagrammatic chordwise section of a leading edge of a wing utilizing the present invention.

While I have so far described my invention as applied to members offering drag only to the airplane, the invention can equally well be applied to lifting surfaces and airfoils. In Figure 9 I have shown a wing section 20 provided with what is commonly known as a "droop snoot" leading edge, found to be highly efficient at relatively low speeds but having high drag at relatively high speeds. In this case the leading edge contour is originally provided by overlays 21 on a permanent sharp leading edge 22, these overlays being of any of the types heretofore described.

From the foregoing description it will be seen that the invention utilizes a temporary overlay on a permanent surface of an aircraft, this overlay being fastened to the permanent surface by a material which permits take-off and initial acceleration with the overlay in place, but which is so affected by aerodynamic heating at higher speeds that the overlay becomes removed by the airstream to expose the permanent surface.

It should be pointed out that the invention is not necessarily restricted for use on external permanent surfaces of aircraft, as the invention can also be useful in conjunction with ducts carrying an airflow in flight such as, for example, the inside of jet engine inlet ducts. Under these circumstances the invention is used to expose a permanent surface contour found to be more suitable for high ram and suction velocities. In this case it is preferred to utilize internal fairings formed from the waxy or resinous materials, as these materials when melted can readily pass through the jet engine without causing engine damage.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In an airplane capable of subsonic and supersonic flight a member having a leading edge, said member having a permanent portion and a temporary portion of a predetermined variation in thickness defining a streamline contour, said portions when combined forming a relatively blunt leading edge of predetermined contour primarily suitable for subsonic flight, said permanent portion alone having a relatively sharp leading edge primarily suitable for supersonic flight, said temporary portion being separable from said permanent portion as said airplane reaches supersonic speed.

2. In an airplane subject to aerodynamic heating in the supersonic speed range, a member having a leading edge exposed to the atmosphere, said member having a permanent portion and a temporary portion of a predetermined variation in thickness defining a streamline contour, said portions when combined having a relatively blunt leading edge of predetermined contour suitable for subsonic flight, said permanent portion alone forming a relatively sharp leading edge suitable for supersonic flight, and means holding said temporary portion on said permanent portion until melted by heat generated by said aerodynamic heating.

3. In an airplane capable of subsonic and supersonic flight and subject to aerodynamic heating in the supersonic speed range, a member capable of sustaining said aerodynamic heating and having a leading edge exposed to the atmosphere, said member having a permanent portion and a temporary portion melting at predetermined temperatures less than that which said member will sustain and of a predetermined variation in thickness defining a streamline contour, said portions when combined forming a relatively blunt leading edge having a predetermined contour suitable for subsonic flight, said permanent portion alone having a relatively sharp leading edge suitable for supersonic flight, said temporary portion being removed from said permanent portion when at supersonic speed by the melting of said temporary portion by said aerodynamic heating.

4. In an airplane, an areodynamic member having a sharp leading edge, and a fairing of material of a predetermined variation in thickness defining a streamline contour and meltable at a temperature on the order of 150° F. applied to said leading edge to change the contour thereof to a predetermined rounded contour.

5. In an airplane capable of supersonic speed, a member over which an airstream passes when said airplane is in flight, said member having an overlay thereon of a predetermined variation in thickness defining a streamline contour of a material melting at a temperature in the range of between about 100° F. and about 200° F. attained by said material due to aerodynamic heating during flight at supersonic speed, to expose a theretofore unexposed surface of said member.

6. In an airplane capable of flight at a speed producing a substantial aerodynamic heating of a surface thereof, a member having a permanent surface contour, an overlay on said permanent surface contour providing a different and temporary predetermined contour, said overlay being fastened to said member by a material meltable at a predetermined temperature attained by aerodynamic heating thereof, whereby said overlay is released in flight to expose said permanent surface contour when said predetermined temperature is reached.

7. In an airplane capable of flight at a speed producing a substantial aerodynamic heating of a surface thereof, a member having a permanent surface contour, an overlay on said permanent surface contour providing a different and temporary predetermined contour, said overlay being fastened to said member by a material meltable at a temperature between 100° and 200° F. attained by aerodynamic heating thereof whereby said overlay is released in flight to expose said permanent surface contour when a temperature in said range is reached.

8. In an airplane, a member having a permanent surface exposable to the airstream in flight and an overlay of material bonded to said permanent surface to form a temporary surface of predetermined contour, said material at the bond being meltable at a temperature attained in flight of over about 100° F.

9. In an airplane, a member having a permanent surface exposable to the airstream in flight and an overlay of material bonded to said permanent surface to form a temporary surface of predetermined contour, said material at the bond being meltable at a temperature attained in flight between about 100° and about 200° F.

10. In an airplane capable of flight at a speed producing a substantial aerodynamic heating of a surface thereof, a member having a permanent surface contour, an overlay on said permanent surface contour providing a different and temporary predetermined contour, said overlay being fastened to said member by a material meltable at a predetermined temperature attained by aerodynamic heating in flight whereby said overlay is released in flight to expose said permanent surface contour.

11. Apparatus in accordance with claim 10 wherein said overlay is formed from a material solid under said aerodynamic heating.

12. Apparatus in accordance with claim 10 wherein said overlay is formed from a material solid under said aerodynamic heating and wherein said overlay is fastened to said permanent surface contour by a bonding layer of said meltable material.

13. Apparatus in accordance with claim 10 wherein said overlay is formed from a material solid under said aerodynamic heating and wherein said overlay is fastened to said permanent surface contour by rivets of said meltable material.

14. The method of reducing the drag of body adapted to be moved through the air at supersonic speed having a member over which an airstream passes, which comprises applying a material meltable by aerodynamic heating to a surface of said member contoured for relatively low drag at supersonic speeds, and shaping the surface of said material into a predetermined contour having a relatively low drag at subsonic speed, whereby, when supersonic speed is attained, said meltable material melts to expose the surface of said member covered by said meltable material.

15. The method of changing the aerodynamic characteristics of a member during flight through the air, which comprises covering a permanently contoured external surface of said member with a material meltable at from about 100° to 200° F., providing said material with a predetermined surface contour different from said permanent contour, and accelerating said member to a speed at which said material melts from the heat of atmospheric friction to expose said permanently contoured surface.

16. The method of changing the contour of a portion of a body capable of moving through air at speeds from subsonic to supersonic and subject to aerodynamic heating which comprises the step of bonding additional material to a permanently contoured surface of said member to provide said member with a temporary predetermined contour, said material, at least at the bond, being meltable at an elevated temperature attained in its movement through the air to permit removal of said material by the airstream, thereby exposing said permanently contoured surface.

No references cited.